Feb. 9, 1932.  C. B. BAILEY  1,844,052
GASKET
Filed May 3, 1926
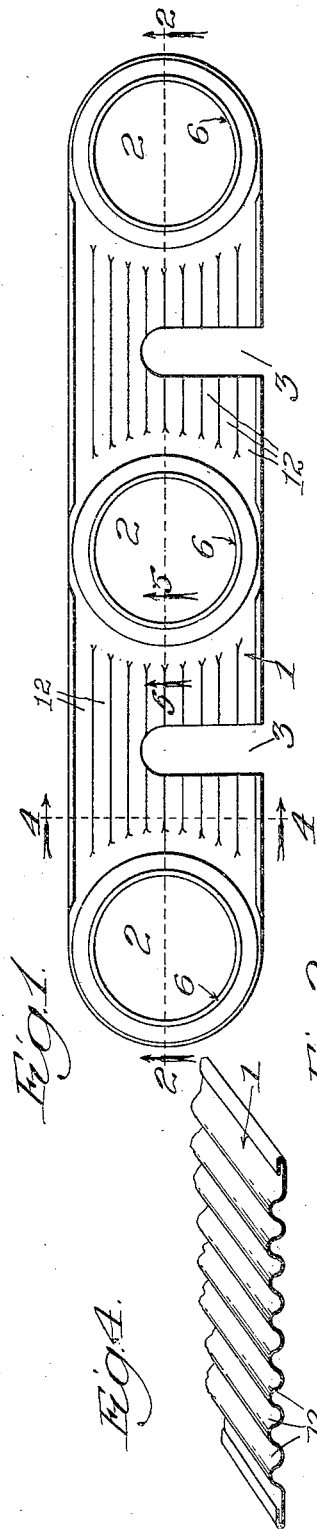
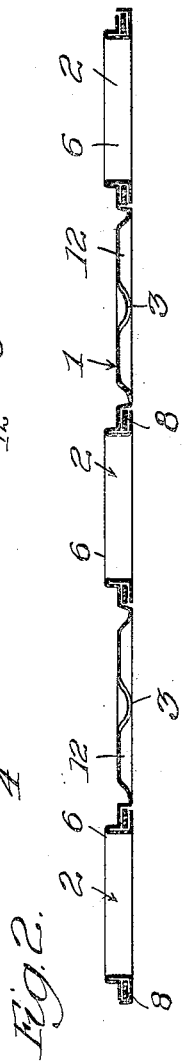
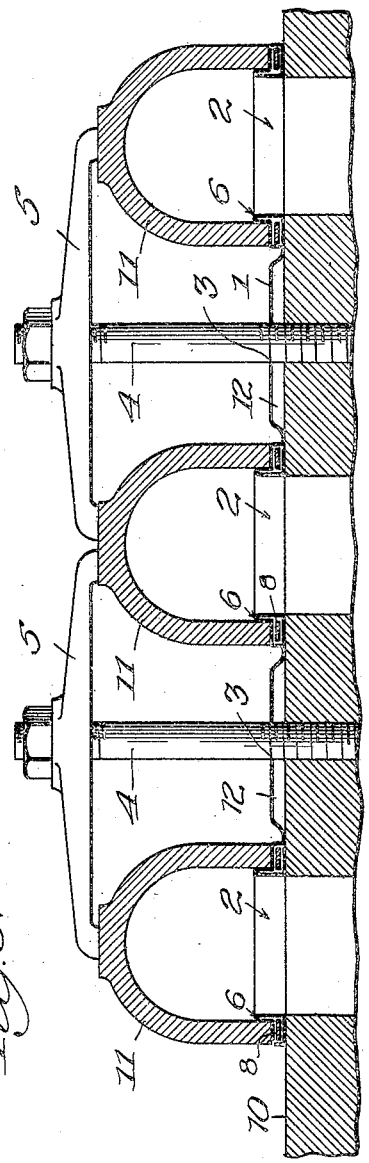
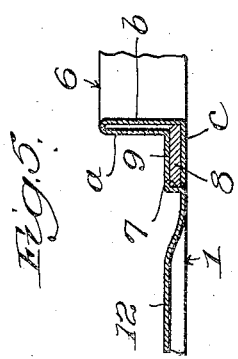
Inventor.
Claude B. Bailey,
By Eugene Bowman
Atty.

Patented Feb. 9, 1932

1,844,052

UNITED STATES PATENT OFFICE

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE

GASKET

Application filed May 3, 1926. Serial No. 106,354.

This invention has particular reference to manifold gaskets, such as are in elongated or strip form and have a plurality of port holes spaced apart lengthwise of the gasket body so that single gaskets may accommodate a plurality of port openings in a cylinder block and the associated manifold pipes, as in automobile engines.

In my copending application Serial No. 31,484, filed May 20, 1925, now Patent Number 1,738,513, granted Dec. 10, 1929, I have disclosed and claimed a manifold gasket having its body portion of a single layer of sheet metal, with tubular guides of sheet metal carried by the layer about the respective port holes for guiding the manifold pipes into registration with the associated port holes in the cylinder block.

The object of the present invention is to provide the body layer of the gasket with a plurality of corrugations, preferably extending lengthwise of the layer between the port holes therein so as to stiffen the gasket layer against bending and distortion, and thus permit the making of the body of the gasket of a single layer of sheet metal and of a relatively light gage or thickness.

The provision of the corrugations in the body layer of the gasket also makes it feasible to provide the layer with slotted stud holes, which allows the gasket to be easily and quickly applied edgewise over the studs of the manifold clamps.

It is also an object of my invention to form the tubular guides integral with the body layer of the gasket at the respective port holes, so that the guides and the body layer will be integrally connected and thus may be formed from a single piece of sheet metal to cheapen the cost of manufacture and avoid the use of separate sheet metal parts in the gasket structure.

The invention consists further in the matters hereinafter described and claimed.

In the accompanying drawings—

Fig. 1 is a plan view of a manifold gasket constructed in accordance with my invention;

Fig. 2 is a longitudinal sectional view taken on line 2—2 of Fig. 1;

Fig. 3 is a vertical sectional view showing the gasket clamped in place between a cylinder block and associated manifold pipes;

Fig. 4 is a perspective sectional view taken on line 4—4 of Fig. 1; and

Fig. 5 is an enlarged vertical sectional view taken on line 5—5 of Fig. 1.

The manifold gasket shown in the drawings has a relatively narrow and elongated body portion 1 of a single layer of sheet metal, such as copper, brass, aluminum, zinc, or the like. The body layer 1 is provided with a plurality of port and stud openings 2, 3 spaced apart lengthwise of the layer, with the port openings 2 larger than the stud openings 3. The latter are in the form of slots extending through one edge of the body layer 1 so that the gasket may be readily and easily applied edgewise over the studs 4, 4 of the manifold clamps 5, 5 without requiring that the clamps be removed from the studs, as would be the case should these openings be in the form of bolt holes.

The gasket is provided with a plurality of tubular guides 6, 6 about the respective port holes 2, 2 and projecting outward from one side of the body layer 1. These guides are formed integral with the body layer by bending the metal stock of the layer about the port holes in guide form, as shown in the drawings.

Each guide, as shown in Fig. 5, is of a double thickness of sheet metal. This is brought about by folding on itself the metal portion making up the guide so that the latter has inner and outer annular portions $a$, $b$ for strengthening purposes. These parts are integrally connected by the fold in the metal between them, and this fold constitutes the outer edge of the guide, as shown in Fig. 5.

The metal of the layer 1 about each port hole 2 is pressed upward out of the plane of the under surface of the layer 1 to provide an annular recess or pocket 7 to receive a ring 8 of asbestos or like material. The upper wall 9 of the recess covers the upper surface of the ring, and this wall joins the outer portion $a$ of the guide at the base thereof, as shown in Fig. 5. The inner member $b$ of the guide extends through the port hole 2 and through the ring 8 to shield the same. The marginal portion of the inner member is flanged outward, as at c, to overlap the ring 8 on the under side and hold the same in the pocket or recess 7 and against the wall 9 thereof.

The wall 9 and flange c extend over the ring to its full width, the ring being generally flat so as to completely cover the same and serve to conceal the same in the pocket 7.

In use, the gasket is clamped by the clamps 5 between a cylinder block 10 and manifold pipes 11, as shown in Fig. 3.

The body layer 1 is stiffened against bending and distortion by providing corrugations 12, 12 therein. These corrugations extend lengthwise of the body layer in parallel relation to each other and to the side edges of the gasket, as shown in Fig. 1. The corrugations terminate short of the port holes 2 so as not to interfere with the rings 8 and associated portions of the gasket. The wall 9, flange c, and interposed ring 8 provide the pressure receiving and joint sealing sections of the gasket immediately about the port holes therein. The slotted stud openings 3 are formed in the corrugated portions of the layer 1 so that the layer is stiffened at the slots. By corrugating the body layer, the gasket may be made cheaper and will stand up to better advantage, due to elimination of excess material heretofore required to make the gasket stiff enough for manifold or other purposes. Moreover, by the corrugations, the body layer will be made stiff enough to permit the use of slotted stud holes.

The details of structure shown and described may be variously changed and modified without departing from the spirit and scope of my invention. While I have shown and described my invention with respect to the corrugations applied to a manifold gasket, it is of course to be understood that the corrugations may equally as well be applied for stiffening purposes to cylinder head and other types of gaskets and I have so claimed this feature herein.

I claim as my invention:

1. A manifold gasket having a body portion of a single layer of sheet metal with stud openings and port holes therein spaced apart lengthwise of the gasket, tubular guides carried by the body layer immediately about the respective port holes and projecting outward therefrom, and corrugations provided in the body layer between and entirely beyond said guides to stiffen the body layer against bending between the guides.

2. A manifold gasket having a body portion of a single layer of sheet metal with stud openings and port holes therein spaced apart lengthwise of the gasket body, asbestos rings at the respective port holes, tubular guides carried by the body at the port holes and having flanges engaging the rings for holding the same against the body, and corrugations provided in the body layer between and entirely beyond said guides and rings to stiffen the body layer against bending between the same.

3. A manifold gasket having a body portion of a single layer of sheet metal with stud openings and port holes therein spaced apart lengthwise of the gasket body, tubular guides formed integral with the body layer at the port holes and projecting outward therefrom, said guides having inner and outer annular portions with the inner portions extending through the port holes, asbestos rings on the side of the body layer opposite the guides, flanges on the inner portions of the guides and engaging the rings to hold the same against the body layer, and corrugations provided in the body layer between and entirely exterior of the guides and rings to stiffen the gasket against bending between the same.

4. A manifold gasket having a body portion of a single layer of sheet metal with stud openings and port holes therein spaced apart lengthwise of the gasket body, said body layer having annular recesses stamped therein from the under side of the body layer about the respective port holes, asbestos rings in said recesses, and tubular guides carried by the body layer at the respective port holes and projecting outward therefrom from the upper side of said body layer, said guides having portions extending through said port holes and provided with flanges in the plane of the under side of the body layer and engaging the rings to hold the same in said recesses.

In testimony whereof I affix my signature this 29th day of April, 1926.

CLAUDE B. BAILEY.